United States Patent Office 3,052,666
Patented Sept. 4, 1962

3,052,666
METHOD FOR PURIFYING POLYOLEFIN
Willem F. Engel, Amsterdam, Netherlands, assignor to Shell Oil Company, a corporation of Delaware
No Drawing. Filed Jan. 9, 1959, Ser. No. 785,780
Claims priority application Netherlands Jan. 13, 1958
7 Claims. (Cl. 260—94.9)

This invention relates to a method for separating residual catalysts from polymeric olefins. More specifically, it relates to a method for removing residual catalyst comprising chromium oxide carried on a silica-alumina carrier from polyolefin resins.

It is known that certain olefins may be polymerized in the presence of a catalyst of the above type and one method of conducting the polymerization is given in United States Patent 2,825,721. In processes of this type, it is necessary to remove the catalyst in order to avoid a green color due to the chromium and to avoid other undesirable properties in the polymer such as corrosiveness and abrasion due to the chromium oxide and the alumina-silica present.

Usually the polymer is formed in the presence of an aliphatic solvent and substantial amounts of the polymer are present in solution while some polymer is in solid form. When the polymerization is conducted under the most favorable conditions substantial amounts of polymer are formed which are solid, even in the presence of the solvent, because of the high molecular weight of the desired polymer. In addition, the high molecular weight polymer frequently adheres to the catalyst particles. Thus, the obvious method of separation, i.e., filtration, has certain disadvantages. Briefly, these include the necessity for adding more solvent to dissolve the solid polymer, or in certain cases where the solids are difficult to dissolve it is necessary to heat the solution and filter the hot solution. Another disadvantage resides in the fact that catalyst particles are rather small and break into such fine particles that filtration does not remove as much catalyst as is desired. The small particles also tend to clog a filter and rapidly reduce the rate of filtration.

The invention is particularly valuable when the polymerization is carried out according to the process of my copending application Serial No. 775,696, filed November 24, 1958, now abandoned, where the polyolefin provides loose solid polymer granules, and it is therefore undesirable to liquify it, dissolve it, or heat it above its softening point.

Thus it is a primary object of this invention to provide a practical method of removing substantially all of the catalyst material by simple chemical methods and without using filtration.

These and other objects are accomplished by a process for separating catalysts containing chromium oxide carried on a silica-alumina carrier from olefin polymers, comprising treating the olefin-catalyst mixture with a material capable of forming a water soluble complex with chromium, and treating the mixture with a solution which reacts with silica to form a removable product.

The catalyst referred to herein, includes any catalyst comprising the oxides of silicon, aluminum and chromium which are capable of catalyzing the polymerization of olefins. In particular, the catalyst is generally a composition containing chromium oxide on a silica-alumina carrier which has been activated by a special treatment. The carrier contains alumina and silica either in a physical mixture such as the two oxides in gel form, or chemically bound together such as natural clay which has been treated with sulfuric acid. The carrier is then impregnated with a solution of chromic acid or a chromium containing salt such as chromic nitrate, aluminum chromate or aluminum dichromate. After impregnation, the catalyst mass is dried and heated in dry air to a temperature of at least 300° C. and usually above 500° C. The more complete description of preparation of a suitable catalyst may be found in United States Patent 2,825,721 or applicant's copending application Serial No. 775,696, filed November 24, 1958, now abandoned. The catalyst is chaarcterized by a rather high surface area to weight ratio and by containing at least some of the chromium in the hexavalent state. However, after polymerization, it is likely that most of the chromium is in trivalent state, because of reduction thereof with the solvent, and in a preferred method of conducting the polymerization, at least some reduction is done before polymerization begins. In any event, there is at least some trivalent chromium oxide which must be removed.

It has been found, quite unexpectedly, that substantially all of the water insoluble chromium oxide including oxides of trivalent chromium will form soluble complexes with groups of material capable of forming soluble complexes with aqueous solutions of chromium ion. This was unexpected, because oxides of chromium do not ordinarily form such soluble complexes. In the present case, it is particularly unexpected, because it is necessary to heat the chromium oxide to a temperature of 300° C. and usually above 500° C. in order to activate it as a catalyst. Such conditions would be expected to render chromium oxide even more insoluble to chrome complex forming agents.

It is believed that the reason the oxides of chromium in the catalyst are capable of forming such complexes in aqueous solution is due to the fact that the chromium oxide exists as exceedingly fine material on the surface of the catalyst and is in a completely different physical form than oxides of chromium generally. Whether this is true or not, experimental evidence shows that the chromium oxide in the catalyst is dissolved substantially completely by agents which are incapable of dissolving ordinary chromium oxide. Thus, it is believed that there is a physical reason for the high reactivity of the chromium oxide catalyst with chrome-complex forming agents. As further evidence of this, a wide variety of chrome-complex forming agents are suitable.

In general, any chrome-complex forming agent is suitable in the practice of this invention. Particularly suitable are the complexing agents containing oxygen in their functional groups and no other elements than carbon and hydrogen in the molecule. Specific examples include carboxylic acids such as oxalic acid, tartaric acid, citric acid and acetic acid, and 1,3-diketones such as an acetyl acetone. The di- or poly-basic carboxylic acids are preferred to the mono-basic carboxylic acid.

The various complex forming agents are generally employed in aqueous solution. However, other solvents such as alcohols may also be used. The concentrations of the solutions and temperatures used are not critical and may be varied greatly. However, it is often desired to use a temperature below the softening point of the polyolefin where the solid polyolefin is in the form of loose solid granules. A noticeable effect of the action of these complex forming agents on the said catalysts is obtained at room temperature and even lower temperatures. It is preferable, however, to operate at elevated temperature, particularly above the softening point of the polymer where the polyolefin is in a form difficult to penetrate and is present as a coating on the catalyst, for example at the boiling points of the solutions which are to be used in this treatment. This causes the polymer to liquify and removes solid coatings of polymer on the catalyst. If the temperature exceeds these boiling points, it is necessary to increase the pressure as well. In addition to removal of chromium oxide, some complex forming agents make the aluminum oxide wholly or partly soluble.

The removal of silica and the remainder of the alumina is achieved by treatment with a solution which reacts with silica to form a removable product. By removable product, is meant a material which is soluble in the solution or which passes off as a gas. Suitable materials include members selected from the class consisting of alkali metal hydroxides, alkali carbonates, and hydrogen fluoride.

In the treatment with alkaline liquids, great freedom is also permitted in the choice of temperature and concentrations of solutions. High temperatures are again preferred as in the formation of the complex. In general preference is given to concentrations of 1 to 2 N or over.

The rate at which silica is dissolved in the alkaline liquid is considerably accelerated when the treatment with a complex forming agent is carried out first. Consequently this order of treatment is generally preferred, although it is not essential.

If the treatment with an alkali metal hydroxide solution is the first of the treatments according to the invention, alumina is dissolved in addition to silica, the chromium oxide remaining behind. This chromium oxide is then converted into complexes in the second stage together with any remaining alumina.

Silica and alumina may also be reduced to the soluble form by the effect of hydrogen fluoride as well as by alkaline liquids. By using gaseous hydrogen fluoride in the absence of water, silicon may be volatilized in the form of silicon tetrafluoride.

After the treatment with complex forming agents, and also after the treatment with liquids which dissolve the silica, the polymer is generally washed with water to which is added a small quantity of a surface-active material.

The process according to the invention is very suitable for the removal of catalysts consisting of the oxides of chromium, aluminum and silicon from polymers of olefins, which polymers are produced in solid form, viz. at temperatures lower than the softening point of the polymer, for instance according to my copending application Serial No. 775,696, filed November 24, 1958, now abandoned as mentioned above. These polymers have a fine structure which enables the liquids used according to the invention to penetrate into the polymer.

In order to promote the penetration of the liquids used according to the invention into the polymer and the pores of the catalyst particles, it is desirable to apply evacuation before or during the treatment with these liquids. A subatmospheric pressure of 0.2 to 0.8 atmosphere generally gives a marked improvement.

Another method of promoting the penetration of the liquids used into the polymer and the pores of the catalyst particles is to add small quantities of surface-active materials to these liquids. In this case, surface-active materials are preferably used which are free from inorganic metal ions. Therefore non-ionic surface-active agents are used in the preferred method of this invention. The amount of surface-active agent should be at least 0.01% by weight and will usually be between 0.01 and 1% by weight. The preferred class of surface-active agent is the condensation product of ethylene oxide and alcohols or phenols. In general, there will be from 8 to 20 moles of ethylene oxide per mole of alcohol or phenol, and usually the alcohol will contain from about 6 to 20 carbon atoms. The preferred phenols include phenols having an alkyl substitute in which the alkyl group will have at least 6 carbon atoms. Specific examples of surface-active agents include the condensation of cetyl alcohol or allyl alcohol with from 8 to 14 moles of ethylene oxide per mole of alcohol, octyl phenol condensed with 8 to 11 moles of ethylene oxide, and octyl cresol condensed with 9 moles of ethylene oxide.

In accordance with a polymerization process covered in a copending application, carrier, i.e., silica-alumina having a high surface area, is physically mixed with catalyst particles in order to increase the productivity of the catalyst. In such a case the carrier is generally present outside the polymer whereas the catalyst particles are inside the polymer or covered with a solid coat or layer of polymer.

In such a case, the carrier may be removed to a large extent by adding an aqueous solution of a surface-active agent and shaking the polymer solution and aqueous solution together. After shaking, the two layers separate and most of the carrier together with some of the catalyst will have settled at the bottom of the aqueous solution. In this way, a simple removal of silica and alumina is effected so that the amount of silica and alumina which must be removed by chemical treatment is considerably reduced.

The invention is further illustrated by the following examples:

EXAMPLE I

The treatment according to the invention was applied to polyethylene obtained according to a method covered in my copending application Serial No. 775,696, filed November 24, 1958, now abandoned referred to above. The method of preparation is as follows:

Preparation of the Catalyst

A commercial cracking catalyst consisting of fine spherical particles of a gel of alumina and silica was used as a starting material. The cracking catalyst had the following properties:

Ratio by weight $Al_2O_3:SiO_2=$ _____ 25:75.
Particle size _____ 20–120 microns.
Pore volume _____ 1 ml./gram.
Surface area _____ 716 sq. m./gram.

50 grams of this cracking catalyst were heated for 10 hours to 650° C. in an air stream containing 5% by volume of water vapor. The mixture of air and water vapor was passed through at a rate of 30 litres per hour. It was then cooled to room temperature by a dry air stream. After such treatment, the material had a surface area of 425 sq. meters per gram and was suitable as a carrier for the chromium oxide.

55 ml. of an aqueous solution of $CrO_3$, which contained 1.442 grams of $CrO_3$ at this volume, were added to 30 grams of the carrier with stirring at a temperature of 20° C. This quantity of solution was the largest which could be absorbed by the carrier without unabsorbed liquid phase remaining.

After the impregnation the material was dried on a steam bath with stirring and subsequently air-dried at a temperature of 120° C. for one hour. It was then heated in a glass tube for 5 hours to a temperature of 500° C. while a carefully dried air stream was being passed through in a quantity of 30 litres per hour.

20 mg. of the resultant product were again heated to 500° C. in a glass tube for half an hour, dry air being passed through. This tube was subsequently sealed by melting and only cooled afterwards so as to entirely prevent contact with moisture. The sealed tube which contained 200 mg. of catalyst (2.5% Cr.) was placed in a carefully dried 300 ml. autoclave. A part of the carrier was not impregnated. A portion of 1 gram of this part was heated in a glass tube for half an hour, again to a temperature of 500° C., dry air being passed through. The tube was subsequently sealed by melting, cooled and placed in the autoclave along with the catalyst. After being closed, the autoclave was evacuated several times and purged with pure, oxygen-free nitrogen. The glass tubes were broken by shaking, after which the autoclave was evacuated twice more and purged with nitrogen. 100 ml. of pure isooctane (2,2,4-trimethylpentane) were then introduced into the autoclave. The resultant mixture was heated to 80° C. in 12 minutes with shaking, kept at 80° C. for 30 minutes, and then cooled, the cooling taking an additional 30 minutes.

Polymerization

At 30° C. dry, pure ethylene was added to the autoclaves and brought to a total super-atmospheric pressure of 10 kg./sq. cm. Polymerization was then started up by careful heating and the temperature increased to 90° C. in the course of 15 minutes, the pressure, without any fresh supply of ethylene, rising to 14.2 kg./sq. cm. 10 minutes later 105° C. was reached. The temperature was then increased to 110° C. in 5 minutes. The pressure which was then 20 kg./sq. cm. was increased to 25 kg./sq. cm. by supplying additional ethylene (total super-atmospheric pressure). The reaction was so rapid that the pressure could not be increased further while maintaining a temperature of 110° C. After 10 minutes at 110° C. the mixture was cooled to 105° C. and maintained at this temperature during the remainder of the reaction while the pressure was increased to 32 kg./sq. cm.

Under these conditions a polymer was formed consisting of loose, spherical particles having a diameter of from 0.2 to 1 mm. The bulk density was 0.4/ml., being a very satisfactory figure. The intrinsic viscosity was 6.6 (determined as above). The yield was 330 grams/per gram of catalyst (13.2 kg. per g. of Cr). The polymer therefore contained 0.3% of catalyst and 2.8% of chromium-free carrier.

6 grams of the product were introduced into 150 ml. of water in which had been dissolved 0.05% by weight of a condensation product of 1 mole octyl phenol with 9 moles of ethylene oxide as a surface-active agent. Stirring was applied for 30 minutes. After stirring 77% of the chromium-free carrier was found to have been separated from the polymer particles and settled on the bottom.

The polymer was separated from the settled carrier by decantation and from the water by filtering. The polymer was then mixed with 150 ml. of a 10% aqueous solution of tartaric acid which also contained 0.05% of the above-mentioned surface-active material. After stirring the mixture for 15 minutes at 20° C. in a flask, it was subjected to a pressure of 0.5 atmosphere in order to remove the last remnants of gas from the polymer. The mixture was then stirred at 60° C. for 2½ hours. The polymer was then separated from the tartaric acid solution and stirred for 12 hours at 20° C. with 500 ml. of an aqueous 10% sodium hydroxide solution which also contained 0.05% of surface-active material. After 15 minutes stirring at 20° C. the mixture was subjected to a pressure of 0.5 atmosphere 3 times and then stirred for 8 hours at 60° C. The solution was separated and the polymer successively washed (by stirring) at 20° C. for 1 hour with 150 ml. of a 5% sodium hydroxide solution, for 8 hours with 250 ml. of water containing 0.05% of surface-active material, for 2 hours with 150 ml. of 1 N hydrochloric acid and again for 8 hours with 250 ml. of water containing 0.05% of surface-active material. The polymer was dried at 60° C. and a pressure of 0.25 atmosphere. The ash content of the purified polymer was 0.09%.

EXAMPLE II

The procedure of Example I was repeated except that the sodium hydroxide solution was replaced with a 20% aqueous solution of hydrogen fluoride. A polyethylene flask being used as reaction vessel. The mixture was shaken for 3½ hours at 20° C. The polymer was then washed five times by shaking for 30 minutes with quantities of 150 ml. of water containing 0.05% of surface-active material. After the polymer had been dried the ash content was found to be 0.07%.

EXAMPLE III

The procedure of Example I was again repeated except that the described treatment with tartaric acid at 60° C. was replaced by treatment with 150 ml. of a 10% solution of one of four acids mentioned below, for 1 hour at the boiling temperature of the solution. In this way four separate samples of polymer were treated, the first with acetic acid, the second with oxalic acid, the third with tartaric acid and the fourth with citric acid. All the solutions contained 0.05% of surface-active material. In all these instances the green color which was due to chromium compounds disappeared from the polymer. The ash content of the purified polymer was below 0.1% in all cases.

EXAMPLE IV

The procedure of Example I was repeated except that the described treatment with tartaric acid was replaced by a treatment with 50 ml. of acetyl acetone at 100° C. for half an hour. In this case the green color also disappeared from the polymer and the ash content was less than 0.1%.

I claim as my invention:

1. A process for purifying polyolefins which have been polymerized in the presence of a catalyst consisting essentially of chromium oxide on a silica-alumina carrier, comprising separating said catalyst from the polyolefin by treating the crude solid particulate polyolefin with an aqueous solution of a member of the class consisting of carboxylic acids and 1,3-diketones in the presence of a surface active agent to cause reaction of the chromium component of the catalyst with said member of the defined class and cause the chromium to pass over into the aqueous solution, separating the aqueous solution from the crude polyolefin, treating the polyolefin with an aqueous solution of a member of the class consisting of alkali metal hydroxide and hydrofluoric acid to remove the silica and the remainder of alumina from the polyolefin, and separating the thus purified polyolefin from the aqueous solution.

2. The process defined in claim 1, in which oxalic acid is used.

3. The process defined in claim 1, in which tartaric acid is used.

4. The process defined in claim 1, in which citric acid is used.

5. The process defined in claim 1, in which acetyl acetone is used.

6. A process for purifying polyolefins which have been polymerized in the presence of catalysts consisting essentially of chromium oxide on a silica-alumina carrier, comprising separating said catalyst from the polyolefin by treating the polyolefin catalyst mixture with water containing from 0.1 to 1% of a nonionic surface active agent to transfer at least some of the catalyst material into the water phase, separating the crude polyolefin from the water phase, treating the crude solid particulate polyolefin with an aqueous solution of a member of the class consisting of carboxylic acids and 1,3-diketones in the presence of a surface active agent to cause reaction of the chromium component of the catalyst with said member of the defined class and cause the chromium to pass over into the aqueous solution, separating the aqueous solution from the crude polyolefin, treating the polyolefin with an aqueous solution of a member of the class consisting of alkali metal hydroxide and hydrofluoric acid to remove the silica and remainder of alumina from the polyolefin, and separating the thus purified polyolefin from the aqueous solution.

7. The process defined in claim 6, in which said mixture is exposed to sub-atmospheric pressure of 0.2 to 0.8 atmosphere.

References Cited in the file of this patent
UNITED STATES PATENTS

| | | |
|---|---|---|
| 2,728,753 | Russum et al. | Dec. 27, 1955 |
| 2,814,610 | Braidwood | Nov. 26, 1957 |
| 2,825,721 | Hogan et al. | Mar. 4, 1958 |
| 2,827,445 | Bartolomeo | Mar. 18, 1958 |
| 2,845,412 | Heyson | July 29, 1958 |

(Other references on following page)

UNITED STATES PATENTS

| | | |
|---|---|---|
| 2,870,113 | Jones | Jan. 20, 1959 |
| 2,886,561 | Reynolds et al. | May 12, 1959 |
| 2,905,659 | Miller et al. | Sept. 22, 1959 |
| 2,919,264 | Frese et al. | Dec. 29, 1959 |
| 2,953,554 | Miller et al. | Sept. 20, 1960 |
| 2,978,443 | Goldtrap | Apr. 4, 1961 |
| 2,988,543 | Meyer | June 13, 1961 |

OTHER REFERENCES

Martell et al.: "Chem. of the Metal Chelate Compounds," (1952), pub. by Prentice-Hall (N.Y.), pp. 207–237.

Modern Inorganic Chemistry, Mellor Western Printing Services Ltd., Bristol, 1961.